(12) United States Patent
Thijs et al.

(10) Patent No.: US 10,377,911 B2
(45) Date of Patent: Aug. 13, 2019

(54) INK JET INK COMPOSITION

(71) Applicant: Océ Holding B.V., Venlo (NL)

(72) Inventors: Eric P. W. Thijs, Venlo (NL); Richard F. E. Van Hout, Venlo (NL); Richard Van Hameren, Venlo (NL)

(73) Assignee: OCÉ Holding B.V., Venlo (NL)

( * ) Notice: Subject to any disclaimer, the term of this patent is extended or adjusted under 35 U.S.C. 154(b) by 147 days.

(21) Appl. No.: 15/599,707

(22) Filed: May 19, 2017

(65) Prior Publication Data

US 2017/0342293 A1 Nov. 30, 2017

(30) Foreign Application Priority Data

May 26, 2016 (EP) .................................. 16171452
Dec. 2, 2016 (EP) .................................. 16202057

(51) Int. Cl.
| | | |
|---|---|---|
| *C09D 11/54* | (2014.01) | |
| *C09D 11/10* | (2014.01) | |
| *C08K 5/09* | (2006.01) | |
| *C08K 5/10* | (2006.01) | |
| *C09D 11/02* | (2014.01) | |
| *C09D 11/101* | (2014.01) | |
| *C09D 11/30* | (2014.01) | |
| *C09D 11/38* | (2014.01) | |
| *C09D 11/34* | (2014.01) | |

(52) U.S. Cl.
CPC ................. *C09D 11/54* (2013.01); *C08K 5/09* (2013.01); *C08K 5/10* (2013.01); *C09D 11/02* (2013.01); *C09D 11/101* (2013.01); *C09D 11/30* (2013.01); *C09D 11/34* (2013.01); *C09D 11/38* (2013.01)

(58) Field of Classification Search
CPC ......... C09D 11/02; C09D 11/30; C09D 11/38; C09D 11/34; C09D 11/101; C09D 11/54; C08K 5/09; C08K 5/10
See application file for complete search history.

(56) References Cited

U.S. PATENT DOCUMENTS

| | | | |
|---|---|---|---|
| 9,631,107 B2 * | 4/2017 | Secord | .................... C09D 11/12 |
| 2010/0053287 A1 | 3/2010 | Belelie et al. | |
| 2016/0083601 A1 | 3/2016 | Secord et al. | |

FOREIGN PATENT DOCUMENTS

WO   WO 2016/097180 A1   6/2016

OTHER PUBLICATIONS

European Search Report, issued in Priority Application No. 16 20 2057, dated Feb. 1, 2017.

\* cited by examiner

*Primary Examiner* — Sanza L. McClendon
(74) *Attorney, Agent, or Firm* — Birch, Stewart, Kolasch & Birch, LLP

(57) ABSTRACT

The present invention relates to a radiation curable ink composition comprising a gellant and a gel accelerator. The present invention further relates to an ink set comprising such ink composition. The present invention further relates to a method for making such ink composition and a printing method using such ink composition.

6 Claims, 2 Drawing Sheets

INK JET INK COMPOSITION

The present invention relates to an ink jet ink composition. The present invention further relates to an ink set. The present invention also relates to a method for preparing an ink composition. In addition, the present invention relates to a method for applying an image onto a recording medium.

BACKGROUND OF THE INVENTION

Radiation-curable inkjet ink compositions are known in the art. These ink compositions comprise one or more radiation curable components. A special class of radiation curable inkjet ink compositions are phase change radiation curable inkjet ink compositions. These inks are fluid at elevated temperature and become solid—even if not yet cured—at lower temperatures. These inks are typically jetted at elevated temperatures. Phase change inks may become solid or semi-solid upon cooling down on a recording medium, e.g. a sheet of paper. As a result, spread of a droplet of ink on the recording medium may be decreased and color bleeding may be prevented. An example of a phase change radiation curable inkjet ink is a gelling radiation curable inkjet ink. Gelling radiation curable inkjet ink compositions typically comprise a gellant. Gellants are also known in the art as gelling agents or thickeners. The presence of a gellant can cause a viscosity increase in the inkjet ink composition upon cooling of the ink composition. The viscosity increase in the ink composition should be sufficient, to adequately control droplet spreading.

A disadvantage of radiation-curable gelling inks is that, when these inks are applied in a scanning ink jet printing method, a boundary between swaths may be visible. There is a need for gelling radiation curable ink compositions that do result in prints showing no or limited swath boundary visibility.

It is therefore an object of the present invention to provide a radiation-curable inkjet ink composition that do result in prints showing no or limited swath boundary visibility.

SUMMARY OF THE INVENTION

The object of the invention is achieved in a radiation-curable inkjet ink composition, comprising:
a radiation-curable medium;
a gellant, wherein the gellant is an ester compound, the ester compound consisting essentially of a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group and;
a gel accelerator, wherein the gel accelerator is a compound according to formula I

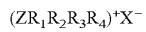
formula I, wherein Z represents N or P,
wherein $R_1$, $R_2$, $R_3$ and $R_4$ each independently represent an alkyl group, an alkene group, an aryl group or an alkylarylgroup, wherein at least one of $R_1$, $R_2$, $R_3$ and $R_4$ is a group comprising at least 8 carbon atoms.

Radiation-Curable Medium

The radiation-curable inkjet ink composition may comprise a radiation-curable medium. The radiation-curable medium may serve as ink vehicle. The radiation-curable medium may comprise at least one radiation-curable component. A radiation-curable component is a component that may react (e.g. polymerize) under influence of suitable radiation, such as electromagnetic radiation, e.g. ultraviolet (UV) radiation. Examples of radiation-curable components are epoxides and (meth)acrylates. (Meth-)acrylates may comprise one or more reactive groups for forming an acrylate polymer. The radiation-curable medium may comprise one type of radiation curable compound or alternatively, the radiation-curable medium may comprise a mixture of radiation-curable compounds.

The radiation-curable medium may further comprise at least one inhibitor. An inhibitor is a component that prevent (inhibits) unwanted polymerization of the radiation-curable compound. Inhibitors may be added to the radiation curable inkjet ink composition to increase the shelf life of the ink composition.

The radiation-curable medium may further comprise at least one photo initiator. A photo initiator is a component that improves the efficiency of curing; i.e. increases the polymerization rate when the ink composition is irradiated with suitable radiation, such as UV radiation.

The radiation-curable medium may further comprise a solvent, such as water or an organic solvent. The solvent may be added to the radiation curable medium to tune ink properties, such as viscosity. Preferably, the amount of solvent is 10 wt % or less, based on the total weight of the ink composition. Preferably, the amount of water is 5 wt % or less, more preferably 0.5 wt % or less, based on the total weight of the ink composition. Further, additional components may be added to the radiation curable medium. For example, the radiation curable medium may comprise surfactants, antibacterial components and anti-fungi components.

Colorant

The radiation curable inkjet ink composition may further comprise a colorant, such as a pigment, a dye or a mixture thereof. Further, the radiation curable inkjet ink composition may comprise a mixture of dyes and/or a mixture of pigments. The colorant may provide the ink composition with a predetermined color.

Gellant

The radiation curable inkjet ink composition may further comprise a gellant. The radiation curable gelling ink composition may be a fluid at elevated temperature. At lower temperatures, such as temperatures below 55° C. or lower, preferably 50° C., for example 45° C. or lower, the gelling agent may form a gel and by forming the gel, the gelling agent may gel the ink. The ink may then be in a so-called gelled phase. Hence, the gelling agent may provide the ink with a phase change upon cooling the ink composition.

The gellant may be an ester compound consisting essentially of a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group.

Hence, the ester compound may consist essentially of a condensation product of a first reactant and a second reactant, wherein the first reactant is a compound A comprising at least 3 hydroxyl functional group functional groups and wherein the second reactant comprises at least one compound B, wherein the at least one compound B comprises a carboxylic functional group. Alternatively, the ester compound may consist essentially of a condensation product of a first reactant and a second reactant, wherein the first reactant is a compound A comprising at least 3 carboxylic acid functional groups and wherein the second reactant comprises at least one compound B, wherein the at least one compound B comprises a hydroxyl functional group.

Preferably, compound B comprises only one second group. In case the second group is a hydroxyl functional group, the compound B preferably comprises only one hydroxyl functional group. In case the second group is a carboxylic acid group, the compound B preferably comprises only one carboxylic acid group.

The ester compound formed by reacting the first reactant and the second reactant may be a nonlinear ester compound. The ester compound may comprise at least three ester groups. The ester compound may provide the radiation curable inkjet ink composition with gelling properties.

In an embodiment, the ester compound does not comprise a (meth)acrylate functional group and/or a vinyl functional group. The ester compound therefore may not undergo a polymerization reaction upon irradiating the ink composition with actinic energy radiation, such as UV radiation.

In an embodiment, the compound A is selected from the group consisting of pentaerythritol, cyclodextrine, glycerol, dipentaerythritol, 2-(hydroxymethyl)-2-methylpropane-1,3-diol, 2-ethyl-2-(hydroxymethyl)propane-1,3-diol, 2-(hydroxymethyl)propane-1,3-diol, trimethylolethane, trimethylolpropane, trimethylolbutane and trimethylolpentane.

These compounds are compounds comprising at least 3 hydroxyl functional groups. When reacted with a carboxylic acid, ester compounds can be formed.

Esters obtainable by reacting a carboxylic ester with a compound A selected from the above listed group may be esters having a branched structure (i.e. non-linear esters). Without wanting to be bound to any theory, it is believed that a branched structure may decrease the tendency of the ester compound to crystallize when cooling down. Hence, ester compound obtainable from the above mentioned polyalcohol components may not crystallize when cooling down. This may improve the gloss of a print made with an ink composition comprising such ester compound.

Methods for synthesizing ester compounds starting from a compound comprising a plurality of hydroxyl functional groups and a compound comprising a carboxylic acid group are known in the art.

In an embodiment, the compound B is a compound according to formula I, wherein R is an alkyl group, an aryl group or an alkylarylgroup, wherein R is a group having 5-30 carbon atoms.

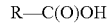     formula I:

Compounds according to formula I are suitable to form ester compounds in accordance with the present invention. The properties of the ester compound may be influenced by the choice of the functional group R. The nature of the R group may for example influence the melting point of the ester compound and the rate of diffusion of the ester compound in the inkjet ink composition. R may be an alkyl group, an aryl group or an alkylarylgroup. When the functional group R comprises an aromatic unit, then pi-pi-interaction may occur. Pi-pi interaction may assist in forming the intermolecular network upon cooling of the ink composition comprising the ester compound, which may be beneficial for the increase in viscosity of the ink composition when cooling down. The functional group R may be a group comprising 5-40 carbon atoms, preferably 10-25. When the functional group R comprises less than 5 carbon atoms, the ester compound may not show gelling behavior at printing conditions. When the functional group R comprises more than 40 carbon atoms, then the ester compound may not be fluid at jetting conditions, which may hamper the jetting of the inkjet ink composition. The ester compound may comprise only one type of functional group R. Alternatively, the ester compound may comprise a plurality of different R functional groups.

In a further embodiment, the compound B is a fatty acid. Fatty acids are suitable for forming esters, when reacted with a compound comprising an hydroxyl functional group. The fatty acids may be saturated or non-saturated fatty acids. Non-saturated fatty acids may be monounsaturated fatty acids or polyunsaturated fatty acids. Non-saturated fatty acids comprise an alkene functional group. Upon curing of the ink, the alkene functional group may react and the ester compound may be incorporated in the network formed by the radiation-curable component. Preferably, the fatty acid is a saturated fatty acid. When the compound B is a fatty acid, no so-called blooming of the ink may occur. Blooming is an unwanted phenomena that may occur in ink composition, such as radiation-curable ink composition comprising a gelling agent. After being applied onto a recording medium, a gelling agent present in the ink may cool down and may solidify, thereby forming a three-dimensional network that increases the viscosity of the ink. However, in the course of time, the gelling agent may migrate to the surface of the ink layer, which may result in matt print appearance. The phenomenon of decreased gloss due to migration of the gelling agent is known as "blooming". Without wanting to be bound to any theory, it is believed that by selecting compound B to be a fatty acid, an amorphous ester compound is obtained, that results in an ink composition that does not show blooming.

In a further embodiment, the ester compound is pentaerythritoltetrastearate. Pentaerythritoltetrastearate is an ester obtainable by reacting pentaerythritol and stearic acid. Stearic acid ($CH_3(CH_2)_{16}COOH$) is a fatty acid.

Gel Accelerator

The radiation curable inkjet ink composition may further comprise a gel accelerator. The gel accelerator may be a compound according to formula I

     formula I, wherein Z represents N or P, wherein $R_1$, $R_2$, $R_3$ and $R_4$ each independently represent an alkyl group, an alkene group, an aryl group or an alkylarylgroup, wherein at least one of $R_1$, $R_2$, $R_3$ and $R_4$ is a group comprising at least 8 carbon atoms.

It was surprisingly found that such compound, when present in a radiation-curable ink composition comprising a gellant, increases the speed of gel formation.

In formula I, Z may represent N or P. In case Z represents N, then the compound is an ammonium compound. In case Z represents P, then the compound is a phosphonium compound.

$R_1$, $R_2$, $R_3$ and $R_4$ may each independently represent an alkyl group, an alkene group, an aryl group or an alkylarylgroup. At least one of $R_1$, $R_2$, $R_3$ and $R_4$ may be a group comprising at least 8 carbon atoms. Preferably, this at least of $R_1$, $R_2$, $R_3$ and $R_4$ may be an alkyl group comprising at least 8 carbon atoms. The alkyl group may be linear or branched. Preferably, the alkyl group may be linear. Preferably, at least two of $R_1$, $R_2$, $R_3$ and $R_4$ may be an alkyl group comprising at least 8 carbon atoms.

$X^-$ may be a counterion. Non limiting examples of such counterion are halides, such as bromide, chloride, iodide or fluoride, preferably chloride or bromide; or organic counterions, e.g. counterions comprising at least one carbon atom. Non-limiting examples of organic counterions are salicylate and thiosalicylate.

The gel accelerator may be present in the radiation-curable inkjet ink composition in an amount of from 0.05-2.0 wt % based on the total amount of the composition, preferably from 0.1-1.5 wt % based on the total amount of the composition, more preferably from 0.2-1.0 wt % based on the total amount of the composition.

The gel accelerator may increase the gelling speed of a radiation curable inkjet ink comprising a gellant. An increased gelling speed may decrease the swath boundary visibility. A decreased swath boundary visibility may increase the print quality.

In an embodiment, at least two of $R_1$, $R_2$, $R_3$ and $R_4$ are alkyl groups comprising at most 4 carbon atoms.

The at least two alkyl groups may comprise 1, 2, 3 or 4 carbon atoms. Preferably, the at least two of $R_1$, $R_2$, $R_3$ and $R_4$ that are alkyl groups comprising at most 4 carbon atoms, are the same.

In an embodiment, each of $R_1$, $R_2$, $R_3$ and $R_4$ represents an alkyl group. Examples of such components are dimethyldioctadecylammonium bromide, dimethyldioctadecylammonium chloride, methyltrioctylammonium bromide, methyltrioctylammonium thiosalicylate, methyltrioctylphosphonium chloride and trihexyldecyl phosphonium chloride.

In an embodiment, $X^-$ is selected from a halide, salicylate and thiosalicylate. Such anions were found to be suitable counterions for the ammonium and phosphonium compounds according to formula I.

In an embodiment, the radiation-curable medium comprises a radiation-curable component. The radiation-curable component may be a (meth)acrylate. An (meth)acrylate may undergo a polymerization reaction when irradiated by suitable radiation, such as UV radiation. Hence, a poly(meth) acrylate polymer may be formed when an inkjet ink composition comprising an (meth)acrylate is cured, thereby hardening the ink. An (meth)acrylate molecule having two or more (meth)acrylate functional groups may react with two or more other (meth)acrylate molecules and hence, a polymeric network may be formed. Examples of (met) acrylates having two or more (meth)acrylate functional groups are known in the art. Alternatively or additionally, the radiation-curable medium may comprise a monofunctional (meth)acrylate.

In an embodiment, an ink set is provided, wherein the ink set comprises a first radiation-curable ink composition and a second radiation-curable ink composition, wherein the first radiation-curable ink composition is an ink composition according to the present invention.

An ink set may comprise a plurality of different inks. For example, the ink set may be a CMYK ink set, comprising a Yellow, a Magenta, a Cyan and a blacK ink composition. At least one of the ink compositions in the ink set may be an ink comprising a gel accelerator, wherein the gel accelerator is a compound according to formula I as described above.

Preferably, a plurality of the ink compositions in the ink set may comprise an accelerator according to formula I as described above. The ink set may further comprise additional colors, such as white, red, green, light magenta, light cyan and/or grey. Further, the ink set may comprise one or more metallic ink compositions. Optionally, the ink set may comprise an undercoat and/or an overcoat composition. An ink set, wherein at least one of the inkjet ink compositions comprises a gellant in accordance with the present invention may allow printing images having good image quality and high gloss.

In an embodiment, the second ink also comprises a gel accelerator according to formula I, wherein the relative amount of gel accelerator in the first ink jet ink is higher than the relative amount of gel accelerator in the second ink jet ink.

As discussed above, the presence of a gel accelerator may increase the strength of a gel network formed upon cooling down and further, the presence of a gel accelerator may increase the speed of gel formation. In an ink set, different ink may be present. There may be differences in speed of gel formation and/or strength of the gel network between the different ink compositions in the ink set. By adding different amounts and/or types of gel accelerator to the different ink, the differences in gel strength and speed of gel formation may be corrected, to decrease or even eliminate the difference n gel strength and speed of gel formation.

In an aspect of the invention, a method for applying an image onto a recording medium is provided, the method comprising the steps of:
  jetting droplets of a radiation-curable inkjet ink composition according to the present invention onto the recording medium.

In the method, an image is applied onto a recording medium. In the method, an image is applied to the recording medium. The image may be applied using an ink composition according to the present invention. The ink composition may be applied onto the recording medium in a predetermined fashion, e.g. in accordance with image files stored on suitable storing means. The image may be applied for example by jetting droplets of the radiation-curable inkjet ink composition using an inkjet print head. The recording medium may be a sheet-like medium, such as a sheet of paper or a sheet of vinyl. Alternatively, the recording medium may be a web, for example an endless belt. The web may be made of a suitable material. Optionally, the image may be dried after it has been applied onto the intermediate transfer member.

Preferably, the method further comprises the step of curing the radiation-curable inkjet ink composition by irradiating the ink composition using UV radiation. The inkjet ink composition may be irradiated using a suitable source of radiation, such as a halogen lamp, a mercury lamp and/or a LED lamp. Optionally, a plurality of sources of radiation may be used to irradiate the inkjet ink composition.

In an aspect of the invention, a method for preparing a radiation-curable inkjet ink composition according to the present invention is provided, the method comprising the steps of:
  providing a gellant, wherein the gellant is an ester compound, the ester compound consisting essentially of a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group;

providing a radiation-curable component;

providing a gel accelerator;

mixing the gellant, the ink vehicle and the gel accelerator.

The radiation-curable component, the gellant and the gel accelerator may be provided. Optionally, additional components may be provided, for example an additional solvent. The radiation-curable component, the gellant and the gel accelerator may be provided neat or they may be provided in a solution or dispersion. Optionally, a colorant may be provided. In case the colorant is a pigment, the pigment is preferably provided as a dispersion, such as an aqueous pigment dispersion. The components may be provided at once, or the components may be added subsequently. The components may be added in any suitable order. In case a dispersible component is added (e.g. a pigment), such dispersible component may be preferably added after the other components of the ink composition are provided. Mixing of the components may be carried out at any suitable temperature, for example room temperature.

BRIEF DESCRIPTION OF THE DRAWINGS

These and further features and advantages of the present invention are explained hereinafter with reference to the accompanying drawings showing non-limiting embodiments and wherein.

In the drawings, same reference numerals refer to same elements.

DETAILED DESCRIPTION OF THE DRAWINGS

Figure 1A:
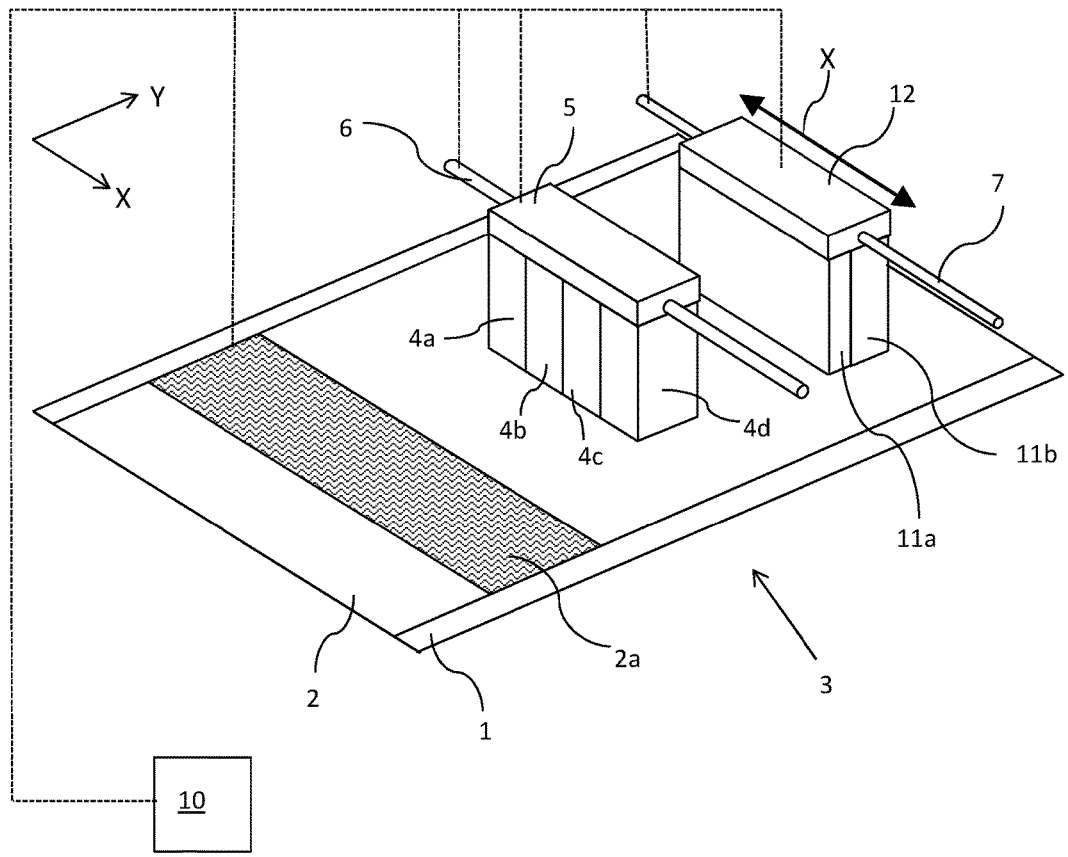
FIG. 1A shows a schematic representation of an inkjet printing system.
Figure 1B:
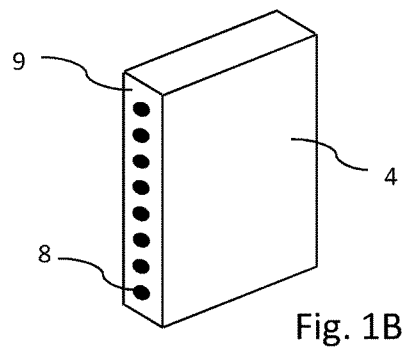
FIG. 1B shows a schematic representation of an inkjet print head.

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4a-4d, mounted on a scanning print carriage 5. The scanning print carriage 5 is guided by suitable guiding means 6 to move in reciprocation in the main scanning direction X. Each print head 4a-4d comprises an orifice surface 9, which orifice surface 9 is provided with at least one orifice 8, as is shown in FIG. 1B. The print heads 4a-4d are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along four print heads 4a-4d provided with a fluid marking material.

The image receiving medium 2, as depicted in FIG. 1A is locally heated or cooled in the temperature control region 2a. In the temperature control region 2A, temperature control means (not shown), such as heating and/or cooling means may be provided to control the temperature of the receiving medium 2. Optionally, the temperature control means may be integrated in the supporting means for supporting an image receiving medium 2. The temperature control means may be electrical temperature control means. The temperature control means may use a cooling and/or heating liquid to control the temperature of the image receiving medium 2. The temperature control means may further comprise a sensor (not shown) for monitoring the temperature of the image receiving medium 2.

A scanning print carriage 5 carries the four print heads 4a-4d and may be moved in reciprocation in the main scanning direction X parallel to the platen 1, such as to enable scanning of the image receiving medium 2 in the main scanning direction X. Only four print heads 4a-4d are depicted for demonstrating the invention. In practice an arbitrary number of print heads may be employed. In any case, at least one print head 4a-4d per color of marking material is placed on the scanning print carriage 5. For example, for a black-and-white printer, at least one print head 4a-4d, usually containing black marking material is present. Alternatively, a black-and-white printer may comprise a white marking material, which is to be applied on a black image-receiving medium 2. For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors. Alternatively, the print head 4a-4d containing black marking material may be larger than any of the print heads 4a-4d, containing a differently colored marking material.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4a-4d comprises an orifice surface 9 having at least one orifice 8, in fluid communication with a pressure chamber containing fluid marking material provided in the print head 4a-4d. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4a-4d are depicted in FIG. 1B, however obviously in a practical embodiment several hundreds of orifices 8 may be provided per print head 4a-4d, optionally arranged in multiple arrays.

As depicted in FIG. 1A, the respective print heads 4a-4d are placed parallel to each other. The print heads 4a-4d may be placed such that corresponding orifices 8 of the respective print heads 4a-4d are positioned in-line in the main scanning direction X. This means that a line of image dots in the main scanning direction X may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8.

The ink jet printing assembly 3 may further comprise curing means 11a, 11 b. As shown in FIG. 1A, a scanning print carriage 12 carries the two curing means 11a, 11b and may be moved in reciprocation in the main scanning direction X parallel to the platen 1, such as to enable scanning of the image receiving medium 2 in the main scanning direction X. Alternatively, more than two curing means may be applied. It is also possible to apply page-wide curing means. If page-wide curing means are provided, then it may not be necessary to move the curing means in reciprocation in the main scanning direction X. The first curing means 11a may emit a first beam of UV radiation, the first beam having a first intensity. The first curing means 11a may be configured to provide the radiation for the pre-curing step. The second curing means 11b may emit a second beam of radiation, the second beam of radiation having a second intensity. The second curing means 11b may be configured to provide the radiation for the post-curing step.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the print heads 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the first curing means 11a and the second curing means 11b are positioned parallel to one another in the sub scanning direction Y. The first curing means 11a and the second curing means 11b may be the same type of energy source or may be different type of energy source. For example, when the first and second curing means 11a, 11b, respectively both emit actinic radiation, the wavelength of the radiated emitted by the two respective curing means 11a, 11 b may differ or may be the same. The first and second curing means are depicted as distinct devices. However, alternatively, only one source of UV radiation emitting a spectrum of radiation may be used, together with at least two distinct filters. Each filter may absorb a part of the spectrum, thereby providing two beams of radiation, each one having an intensity different from the other.

The flat surface 1, the temperature control means, the carriage 5, the print heads 4a-4d, the carriage 12 and the first and second curing means 11a, 11b are controlled by suitable controlling means 10.

EXPERIMENTS AND EXAMPLES

Materials

SR 9003 (propoxylated neopentyl glycol diacrylate) and SR355 were obtained from Sartomer. Pentaerythritoltetrastearate was obtained from NOF as WE-6. Dimethyldioctadecylammoniumchloride was obtained from Sigma Aldrich. All chemicals were used as received.

Methods

Speed of Gel Formation

The Speed of Gel Formation was measured using the following method.

In the first step, the complex viscosity at a specific temperature was measured as a function of time using an AntonPaar MCR302 rheometer with a plate-cone geometry and a gap distance of 0.6 mm. The measurement was performed as follows:

A: the sample was heated in the rheometer to a temperature of 75° C. and was kept at this temperature for 900 s. During this period, a shear of 100 1/s was applied, the oscillation was zero.

Figure 2:
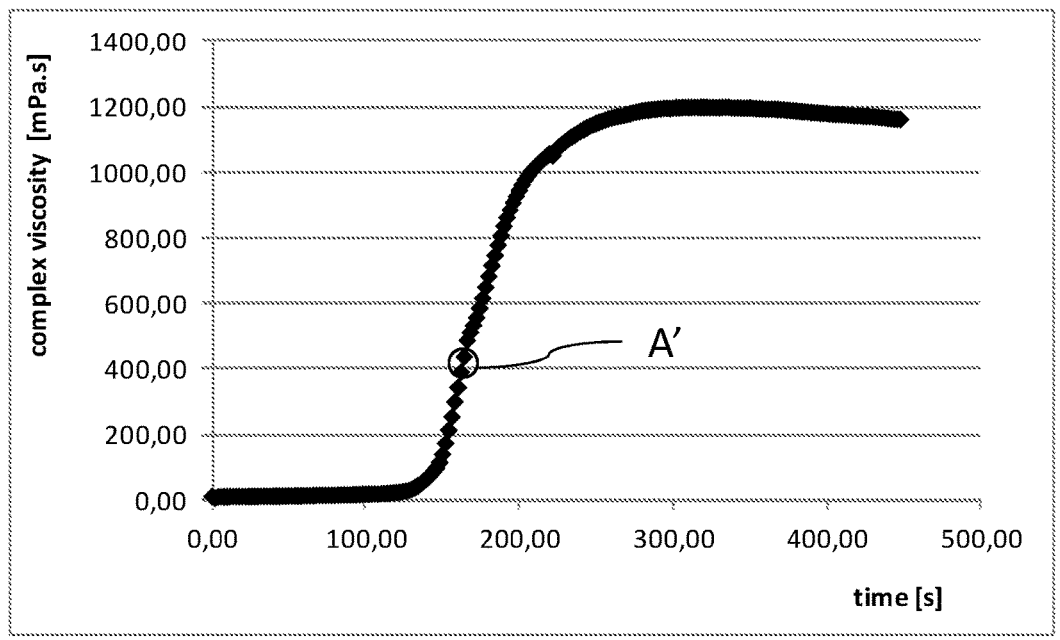
FIG. 2 shows a graph representing a measurement of the complex viscosity as a function of time upon cooling down a sample.

B: the sample was allowed to cool down to a predetermined temperature; the complex viscosity was measured, the shear applied was zero and the oscillation had an amplitude 2% and frequency 1 Hz. The measurement was continued for at least 600 s. In the second step, the complex viscosity was plotted as a function of time, based on the values measured in step B. FIG. 2 shows an example of such graph. At the point where the increase in complex viscosity versus time was highest, the slope was determined. The slope (($\Delta$complex viscosity/$\Delta$time)$_{max}$) represents the gelling speed of the ink composition.

The measurements were performed in a temperature range of from 35° C. to 50° C. at an interval of 1° C.

Example and Comparative Example

A base ink composition was prepared by putting 13.5 gr of pentaerythrotoltetrastearate, a gelling agent (1.5 wt % based on the total weight of the base ink composition), 540 gr of SR9003 (60 wt % based on the total weight of the base ink composition), which is a radiation-curable component and 346.5 gr of SR355 (38.5 wt % based on the total weight of the base ink composition, which is a radiation-curable component, together and mixing the components.

An ink composition according to the present invention was prepared by adding 0.523 gr of dimethyldioctadecylammoniumchloride to 100 gr of the base ink composition, resulting in an ink composition Ex 1, comprising 0.5 wt % of dimethyldioctadecylammoniumchloride. Dimethyldioctadecylammoniumchloride is a gel accelerator in accordance with the present invention and Ex 1 is an ink composition according to the present invention.

The base ink composition was used as comparative example CE 1.

Comparison Experiments

The gelling speed of the ink compositions Ex 1 and CE 1 was determined at a plurality of temperatures in the range of 35° C.-40° C.

FIG. 2 shows a graph representing a measurement of the complex viscosity as a function of time upon cooling down a sample. At the point where the slope of the graph is highest (point A'), the value of the slope was determined.

Figure 3:
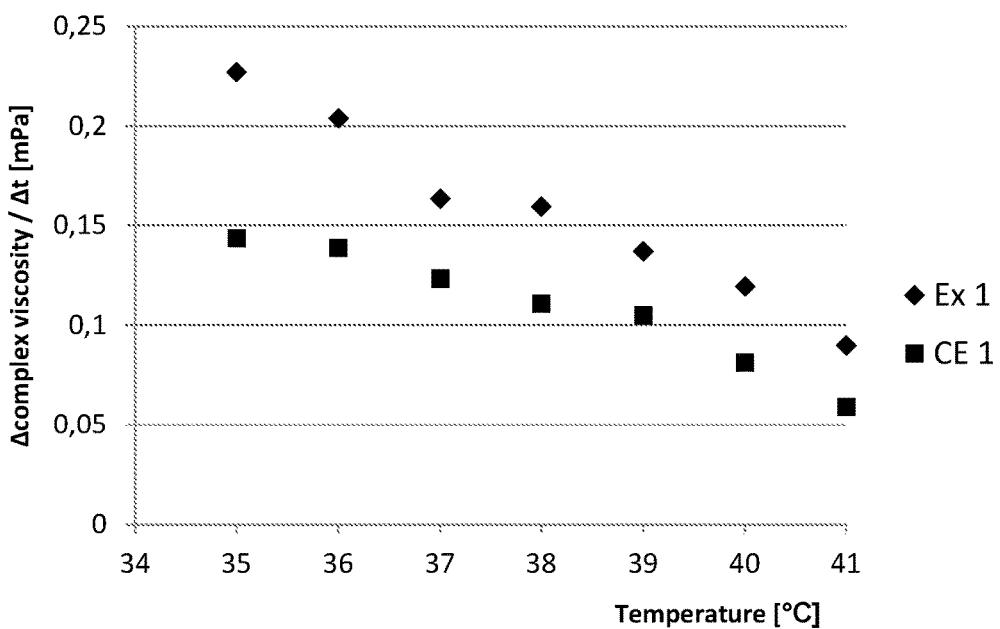
FIG. 3 is a graph, wherein the change in complex viscosity in time is plotted versus the temperature for two different ink compositions.

FIG. 3 is a graph showing the values of the slopes, determined for ink compositions Ex 1 and CE 1 at different temperatures.

The gelling speed of ink composition Ex 1 and CE 1 was determined at several temperatures in the range of 35° C.-50° C. by measuring the increase in complex viscosity versus time upon cooling down. For both ink compositions, the gelling speed decreased with increasing temperatures. However, in the range of 35° C.-50° C., the gelling speed of ink composition Ex 1 was higher than ink composition CE 1.

A high gelling speed correlates to low swath boundary visibility. Thus, using an ink composition according to the present invention, a high gelling speed can be obtained.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. An ink set comprising
a first ink jet ink and a second ink jet ink,
wherein the first ink jet ink is an ink jet ink composition comprising
a radiation-curable medium;
a gellant, wherein the gellant is an ester compound, the ester compound consisting essentially of a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group, and;
gel accelerator, wherein the gel accelerator is a compound according to formula I $$(ZR_1R_2R_3R_4)^+X^-$$ formula I, wherein Z represents N or P,
wherein $R_1$, $R_2$, $R_3$ and $R_4$ each independently represent an alkyl group, wherein at least one of $R_1$, $R_2$, $R_3$ and $R_4$ is an alkyl group comprising at least 8 carbon atoms, and
wherein $X^-$ is selected from a halide, salicylate and thiosalicylate, and
wherein the second ink jet ink comprises a gel accelerator according to formula I, wherein the relative amount of gel accelerator in the first ink jet ink is higher than the relative amount of gel accelerator in the second ink jet ink.

2. The ink set according to claim 1, wherein at least two of $R_1$, $R_2$, $R_3$ and $R_4$ are alkyl groups comprising at most 4 carbon atoms.

3. The ink set according to claim 1, wherein the gellant is a fatty acid ester.

4. The ink set according to claim 1, wherein the radiation-curable medium comprises a radiation curable component.

5. A method for applying an image onto a recording medium, the method comprising the steps of:
jetting droplets of a first ink jet ink and droplets of a second ink jet ink onto the recording medium;
wherein the first ink jet ink is an ink jet ink composition comprising
a radiation-curable medium;
a gellant, wherein the gellant is an ester compound, the ester compound consisting essentially of a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group, and;
gel accelerator, wherein the gel accelerator is a compound according to formula I $$(ZR_1R_2R_3R_4)^+X^-$$ formula I, wherein Z represents N or P,
wherein $R_1$, $R_2$, $R_3$ and $R_4$ each independently represent an alkyl group, wherein at least one of $R_1$, $R_2$, $R_3$ and $R_4$ is an alkyl group comprising at least 8 carbon atoms, and
wherein $X^-$ is selected from a halide, salicylate and thiosalicylate, and
wherein the second ink jet ink comprises a gel accelerator according to formula I,
wherein the relative amount of gel accelerator in the first ink jet ink is higher than the relative amount of gel accelerator in the second ink jet ink.

6. A method for preparing the ink set according to claim 1, the method comprising the steps of:
preparing the first ink jet ink comprising the step of:
mixing the gellant, the radiation-curable medium, and the gel accelerator; and
preparing the second ink jet ink comprising the step of:
providing the gel accelerator;

wherein the relative amount of gel accelerator in the first ink jet ink is higher than the relative amount of gel accelerator in the second ink jet ink.

* * * * *